Feb. 6, 1940. L. H. DRAEGER 2,189,710
HITCHING DEVICE FOR TRAILERS
Filed May 20, 1936
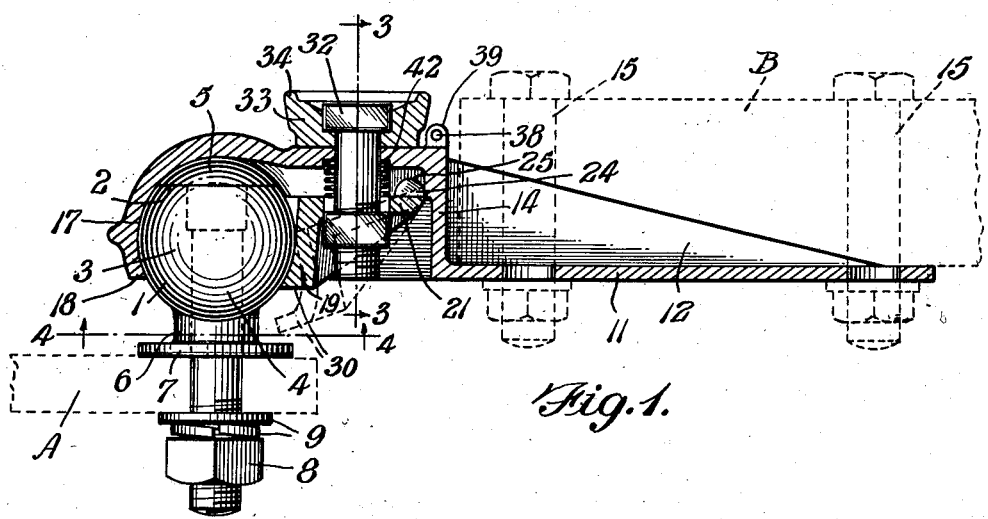
Fig. 1.
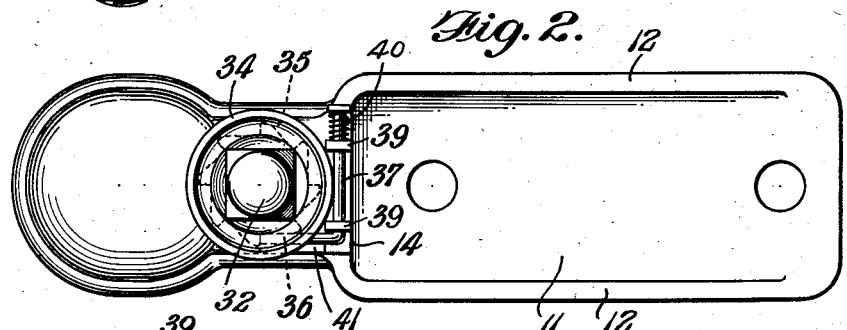
Fig. 2.
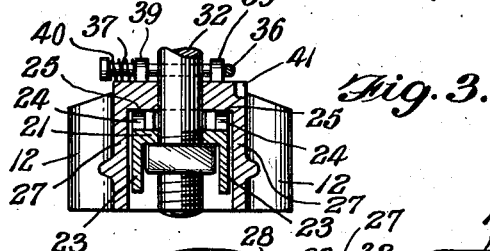
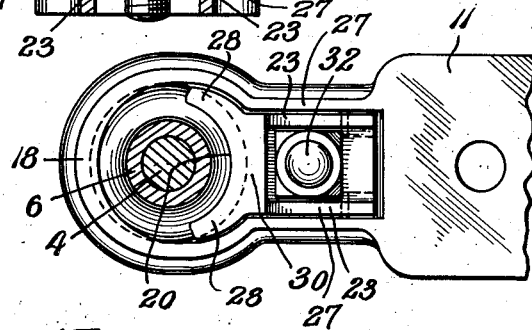
Fig. 4.
Fig. 5.
Inventor
Lloyd H. Draeger,
By Ralph L. Barnett
Attorney Patented Feb. 6, 1940

2,189,710

UNITED STATES PATENT OFFICE 2,189,710

HITCHING DEVICE FOR TRAILERS

Lloyd H. Draeger, Milwaukee, Wis.

Application May 20, 1936, Serial No. 80,861

11 Claims. (Cl. 280—33.17)

This invention relates to improvements in hitching devices for trailers such as shown and described in my U. S. Patent No. 1,978,859, and comprehends certain changes in construction particularly as regards the socket unit for receiving the ball, the means for adjusting the parts of the socket unit and the locking element for retaining the socket parts in fixed adjusted position.

More specifically the present structure includes a hitch element on which a ball of novel form is positioned for cooperation with a two part socket carried by another hitch element, the socket being so designed and arranged as to include one main integral section which encloses more than a half of the spherical ball structure so that the stresses and strains are primarily on the solid mass, and a locking portion of the socket which functions for retaining the ball in its seat in the main section.

Other features of this invention include the elongated shape of the socket seat for the ball permitting its disengagement after loosening of the locking element, the structure of the socket locking element, the adjusting bolt, and the locking means for the latter.

Reference will be had to the accompanying drawing forming a part of this specification and wherein like numerals of reference designate corresponding parts throughout the several views, in which:

Fig. 1 is a longitudinal section.

Fig. 2 is a top plan view.

Fig. 3 is a section on line 3—3 of Fig. 1.

Fig. 4 is a section on line 4—4 of Fig. 1, and

Fig. 5 is a perspective of the lower socket element or locking jaw.

With reference now to the specific structure involved the hitch includes two main elements which when coupled form substantially a universal connection. The first element of the assembly is carried by the draw bar A connected to a propelled vehicle and includes the sectional spherical ball formed with a main body portion 1 having a flat face 2 centrally of the longitudinal axis of the opening 3. The opening 3 is for the reception of the securing bolt 4 that fastens the assembly to the draw bar A and the head 5 of the bolt 4 is of such a contour that when seated on the flat portion 2 completes the spherical ball structure. A neck extension 6 through which the bolt 4 passes is flared at 7 to provide an enlarged seat to cooperate with the nut 8 and washers 9 in clamping the structure to the draw bar A.

The socket element for receiving the ball comprises a main casting which includes a shank 11, having tapering side walls 12, and end wall 14 forming a pocket to receive the draw bar B of a vehicle to be towed. This shank is secured to the draw bar by bolts 15. Projecting longitudinally of the shank and draw bar is the socket for receiving the ball member heretofore described the wall forming the socket at its outer face 17 is of a contour corresponding to the cooperating face of the ball and of such a depth as to enclose the ball to a point substantially below its center. The ball receiving portion of the socket is elongated as shown more clearly in Fig. 2 and this elongation extends a distance slightly in excess of the distance of the inward projection of the lower portion 18 of the outer socket wall whereby the ball may be moved longitudinally for disengagement and removal.

For retaining the ball in its socket and against its seat 17 there is provided the socket locking jaw element 19, shown more clearly in Fig. 5. This locking element 19 comprises a curved wall 20 the outer surface of which corresponds in contour to the outer ball surface, top portion 21 having elongated slot 22 therein, and side walls 23. Integral rounded lugs 24 extend upwardly from the surface of the top portion 21 at diametrically opposite corners, and parallel with the side walls 23, to form pivots which rest in the curved pockets 25 formed in the inner face of the socket in main casting at approximately the junction of the end wall 14 and side walls 27. Projections 28 extend radially from the lower ends of side walls 23 and these projections together with the segmental lower wall 30 complete a filler element or lock block of such a size as to enclose the elongated opening sufficiently to prevent the longitudinal movement of the ball in the socket.

Thus there is provided an element which may be termed freely floating in that it does not have a permanent connection with the main casting, but it will be noted that there is existent a definite relation between the parts due to their structure and arrangement and particularly during adjustment as will more clearly hereinafter appear.

For retaining the locking jaw element in position and adjusting the same there is provided the bolt 31 which extends through an opening formed in the socket in alignment with the elongated slot 22 of the locking element. The head 32 of the bolt 31 seats in a pocket in the lock unit 33 and the nut for this bolt normally rests between the side walls 23 of the locking jaw whereby it is prevented from moving during rotation of the bolt. The rotation of the bolt is accomplished by turning the lock nut 33 in which the head of the bolt seats. It will be noted, that the lock nut 33 includes a serrated enlarged handle portion 34 and a ratchet portion 35, the latter engaging the bent extremity 36 of the lock pin 37. The lock pin 37 extends through the aligned openings 38 formed in the ears 39 and the spring 40 positioned between the head of the pin and one of the ears 39 causes the pin extremity to normally engage within one of the ratchets 35. It will be noted that a shoulder 41 is formed in the casting and this is designed to receive the bent pin extremity when the latter is moved out of engagement with the ratchet 35 to retain the same and thus allow freedom of movement of the lock nut 33. The spring 42 on the bolt 31 between the fixed and free jaws tends to swing the free jaw to open position.

In use the lock pin 37 will first be pushed out of engagement with the ratchet 35 of the lock nut 33 and the latter rotated to permit the lock jaw 19 to swing on its pivots 24 under tension of spring 42 a suitable distance to permit the insertion of the ball in the socket. The nut 33 is then turned, to swing the jaw 19 upward into snug engagement with the ball. Obviously adjustment, engagement and disengagement may be accomplished quickly and by the movement of a minimum of parts. It will be noted that the movable parts are protected from the weather and from accumulation of dirt.

I claim:

1. In a hitch coupler including a ball, a sectional socket for said ball, one of said socket sections being pivoted to the other section and including projections engaging said ball beneath its center, a bolt extending through said sections, a nut on said bolt, means carried by said pivoted section for locking said nut against turning, means for turning said bolt, and means for locking said bolt against turning.

2. In a vehicle coupling including a spherical member, a socket member formed with an elongated recess, the outer portion of said recess being shaped to seat said spherical member and the inner end of said recess being defined by a flattened wall portion, a lock member for adjustably securing said spherical member in said recess, said lock member and said socket member having integral inter-engaging parts adjacent said wall portion, a bolt extending through said locking member and said socket member, a nut on said bolt, and means carried by one of said members for preventing the rotation of said nut, means for turning the bolt, and means for locking the bolt against turning.

3. In a vehicle coupling including a spherical member, a socket member formed with an elongated recess, the outer portion of said recess being shaped to snugly seat said spherical member and the inner end of said seat being defined by a flattened wall portion, recess bearings formed in said socket member adjacent said flattened wall, a lock member for adjustably securing said spherical member in said recess, rocker bearings formed on the upper surface of said lock member and seating in said recess bearings, a bolt extending through said locking member and through said socket member, a nut on said bolt, and means carried by said lock member for preventing the rotation of said nut.

4. In a vehicle coupling including a male member, a socket member formed with an elongated recess, one end portion of said recess being shaped to seat said male member and the other end portion of said recess being defined by a substantially vertical wall portion, freely floating means for adjustably securing said male member in said recess, said means and said socket member having inter-engaging parts adjacent said vertical wall portion, and means for retaining the members in adjusted position.

5. In a vehicle coupling including a male member, a socket formed with an elongated recess, one end portion of the recess being shaped to seat said male member and the other end portion of the recess being defined by a substantially vertical wall portion, means for adjustably securing the spherical member in said recess, said means and said socket member having inter-engaging means adjacent said vertical wall portion forming a pivotal base for said securing means, and means for retaining the members in adjusted position.

6. In a vehicle coupling including a male member, a socket member formed with an elongated recess, one portion of said recess being shaped to seat said male member and another portion being defined by substantially vertical side and end wall portions, clamping means for adjustably securing said spherical member in said recess, said clamping means having at one end extensions inter-engaging with socket portions adjacent said vertical end wall, and means for retaining said parts in adjusted relation positioned partially between said side wall portions.

7. In a trailer coupler, a coupler member having a ball, a coupler member having a shell with a socket to coact with the ball and a shell portion open to the socket and adapted to receive a locking block, a bolt mounted in the wall of the shell, and a locking block on the bolt adapted to be drawn into the shell and then form a part of the socket for locking the ball in place, said locking block, when so drawn, wedging between a wall of the shell opposite the ball and the portion of the ball opposite that portion thereof received in said socket.

8. In a trailer coupler, a coupler member having a ball, a coupler member having a shell with a socket to coact with the ball and a shell portion open to the socket and adapted to receive a locking block, a bolt mounted in the wall of the shell, and a locking block non-rotatable relative to the shell and on the bolt, said block being drawn into the shell by the bolt and then forming a part of the socket for locking the ball in place, and a nut on the bolt, said block having an angular socket to receive said nut and prevent its turning relative to the shell.

9. In a trailer coupler, a coupler member having a ball, a second coupler member having a shell, one portion of which forms a socket to receive the ball, a block movable toward and from position for forming part of the ball holding socket, means for moving the block to its ball holding position, parts being so arranged that when the block is in position to form a part of the socket, it is wedged between the shell and the ball, means for locking the block in ball holding position, and means tending to move the block away from ball holding position when said last means is inoperative.

10. In a trailer coupler, a coupler member having a ball, a second coupler member having a shell, one portion of which forms a socket to receive the ball, a block movable toward and from position for forming part of the ball holding socket, a bolt extending through the wall of the shell, said block having an angular socket-like portion to receive a nut on the bolt, a nut on the bolt in said socket-like portion, a floating ratchet member mounted on the bolt on the opposite side of the shell from the nut, having means for engaging the bolt head to render the bolt and the ratchet member relatively non-rotatable, said shell and said ratchet member being provided with coacting ratchet elements.

11. In a vehicle coupling including a male member, a socket member formed with an elongated recess, the outer end of said recess being shaped to seat said male member and the inner portion defined by substantially vertical end and side wall portions forming a housing, clamping means for adjustably securing said male member in said recess positioned within said housing, said clamping means having portions interengaged with portions of said recess adjacent said vertical wall portion, means extending through said socket member and said clamping means for retaining said parts in adjusted position, and means carried by said retaining means for locking said retaining means in adjusted position.

LLOYD H. DRAEGER.